Sept. 1, 1931.   J. N. VANDEGRIFT   1,820,955
PACKING MATERIAL
Filed March 8, 1929

Inventor
James N. Vandegrift
By his Attorneys
Kenyon & Kenyon

Patented Sept. 1, 1931

1,820,955

UNITED STATES PATENT OFFICE

JAMES N. VANDEGRIFT, OF NEW YORK, N. Y.

PACKING MATERIAL

Application filed March 8, 1929. Serial No. 345,337.

This invention relates to packing material and more particularly to packing material designed for use in connection with bearings operating under conditions of relatively high temperatures.

An object of the present invention is to provide a packing material which is simple to manufacture, inexpensive to use and efficient in operation.

Heretofore in certain types of industry use has been made of packing materials of varied goods in connection with bearing members operating under conditions which necessitate relatively high temperatures. All of the packing material used under such conditions has been found to possess very short life due to the high temperature which in some instances causes charring and consequently disintegration and in other instances causes complete destruction by combustion, etc. In connection with the operation of rotary retorts in the distillation of coal and other carbonaceous materials, it is necessary to provide a packing for sealing the retort to prevent intake of air or loss of vapor and such packing must be capable of standing up under conditions of a rotating surface temperature of over 1000° F. All of the known packings made up of metallic or mixed metallic asbestos and fibre have failed to withstand this temperature and furnish the required sealing for any reasonable length of time.

The present invention overcomes the difficulties encountered heretofore by providing a packing which is durable, which is resilient, and which serves to effectively seal a retort against the entry of air or the escape of vapor. The packing, in addition to forming a stationary material of this nature for use with rotary retorts can be advantageously used in any installation wherein a packing, which is resilient, durable and inexpensive is required. The material of the present invention is composed of a plurality of very fine loosely woven metal strands which may be twisted into the shape of substantially a rope or may be manufactured in any desired shape. The rope or flat strip of material is impregnated with a mixture of graphite and heavy oil, the latter of which serves to cause the graphite to penetrate the metallic strands more readily and thoroughly.

Other features and objects of the present invention will become apparent by reference to the following detailed description read in the light of the accompanying drawings, wherein.

Figure 1:
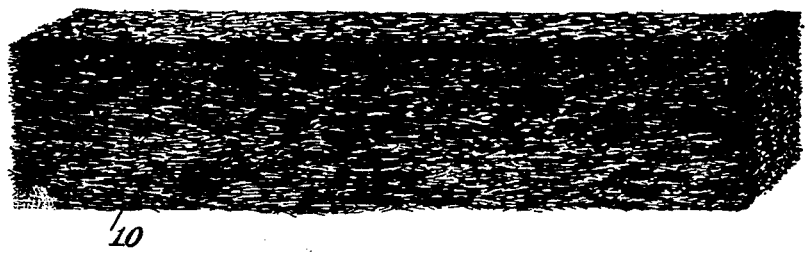
Fig. 1 illustrates a flat strip of packing material made up of a multiplicity of very fine metallic strands.

Referring now to the drawings and more particularly to Fig. 1, 10 illustrates the packing material of the present invention shaped as a flat strip of metallic strands of such fine nature as to form metallic threads intermingled in such manner as to constitute what is known in the art as mineral wool. While any type of mineral wool will serve the purpose of the present invention it has been found in practice that the so-called "steel wool" can be used advantageously. The mineral wool may be impregnated with a mixture of graphite and heavy oil or other suitable lubricant, thereby producing a packing which functions efficiently under various conditions of operation.

Figure 2:
Fig. 2 illustrates material of the same nature twisted into the shape of substantially a rope.
Figure 3:
Fig. 3 is a section taken on the line 3—3 of Fig. 2.

In Fig. 2, the mineral wool is shown twisted into the shape of substantially a rope 11 since it has been found that the material can be handled more readily while in this shape. If so desired, use may be made of a separate strand of the same or other material for binding the roll into the desired shape before using, which strand would, of necessity, be wound in the opposite direction to the winding of the material. As before explained in connection with Fig. 1, the material will be impregnated with a solution of graphite and heavy oil or other suitable lubricant.

Figure 4:
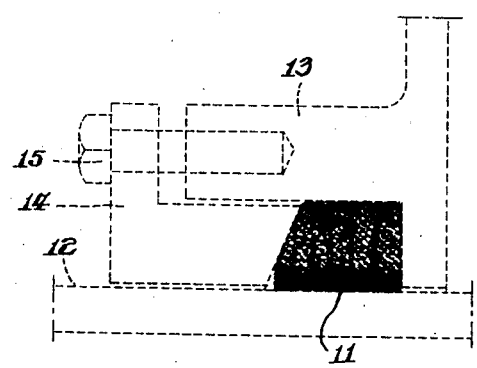
Fig. 4 is a representation of a packing ring illustrating the manner in which the packing may be placed under pressure.

The operation and use of the invention may be considered in connection with a packing ring as illustrated in Fig. 4. In this figure, the rotating member is illustrated in dotted lines as having a surface 12 while around the member extends a stationary ring 13 and a compression ring 14 which is connected to the member 13 by means of a bolt 15 screw-threaded thereinto. The member 14 is disconnected from the member 13 and a number of strips of material in the shape indicated in Fig. 1 or in the shape indicated in Fig. 2 may be introduced as shown, after which the member 14 is brought into contact with the outer portion of the packing material and pressure applied thereto by tightening each of the nuts 15 (one of which is illustrated). Since the packing material is thoroughly saturated with heavy oil and graphite, the graphite, due to the pressure applied to the material and due to the rotation of the surface 12 will in a very short while gradually work down until it becomes concentrated in that portion of the material resting or bearing directly on the surface 12. In this manner there is formed a lubricating surface which is substantially impervious to heat and which will offer the least resistance to friction. The advantages of the present material are numerous. It provides a packing material which is resilient, which can be operated under conditions of relatively high temperature and it is inexpensve to manufacture and to use. When the material is used in connection with a rotary retort or other rotating surface of relatively high temperature, the heavy oil becomes vaporized and is driven off, but the graphite remains concentrated as a lubricating surface between the packing material and the rotating surface. Since the material can be compressed, it will be apparent it serves efficiently to prevent the passage of vapor or air and likewise it, when compressed is oil-tight and dust-proof which is a necessity in the operation of journal boxes, shaft bearings or other uses at ordinary temperatures.

While the drawings and description have referred to the material as being composed of a multiplicity of very fine metallic strands loosely intermingled, it will be evident that loose metallic strands arranged in symmetrical relation with respect to each other can be substituted for the so-called mineral wool referred to above without departing from the spirit of the invention. Moreover, the invention is to be limited not by the illustrated embodiment, but only by the scope of the following claim.

I claim:

A packing material composed of steel wool twisted into resilient compressible strands and impregnated with a solution of graphite and heavy oil.

In testimony whereof, I have signed my name to this specification.

JAMES N. VANDEGRIFT.